United States Patent
Rush

[11] Patent Number: 5,660,367
[45] Date of Patent: Aug. 26, 1997

[54] KNOCK DOWN MOTOR MOUNT

[75] Inventor: William C. Rush, Brunswick, Ohio

[73] Assignee: Premier Manufacturing Corp., Cleveland, Ohio

[21] Appl. No.: 425,905

[22] Filed: Apr. 20, 1995

[51] Int. Cl.$^6$ ............................................. F16M 1/00
[52] U.S. Cl. ................................. 248/674; 248/302
[58] Field of Search ........................ 248/674, 671, 248/637, 220.21, 223.31, 224.51, 302, 188.7, 603, 676, 906; 417/360

[56] References Cited

U.S. PATENT DOCUMENTS

| | | | |
|---|---|---|---|
| 967,971 | 8/1910 | Pollak . | |
| 1,715,669 | 6/1929 | Nuttal | 248/603 |
| 2,022,028 | 11/1935 | Cornell, Jr. . | |
| 2,700,500 | 1/1955 | Wren | 248/637 |
| 2,728,541 | 12/1955 | Hansel | 248/603 |
| 3,446,429 | 5/1969 | Suzuki et al. . | |
| 3,790,114 | 2/1974 | Italiano et al. | 248/637 |
| 4,043,708 | 8/1977 | Greenfield | 248/603 |
| 4,155,528 | 5/1979 | Dawson | 248/674 |
| 4,191,245 | 3/1980 | Wendt et al. | 165/69 |
| 4,199,302 | 4/1980 | Goettl | 415/201 |
| 4,394,111 | 7/1983 | Wiese et al. | 417/360 |
| 4,420,136 | 12/1983 | Lau | 248/674 |
| 4,448,378 | 5/1984 | Binfaré | 248/188.7 |
| 4,502,291 | 3/1985 | Shelton et al. | 248/637 |
| 4,548,548 | 10/1985 | Gray, III | 416/189 |
| 4,657,485 | 4/1987 | Hartwig | 416/247 |
| 4,800,734 | 1/1989 | Sauber et al. | 62/263 |
| 5,022,620 | 6/1991 | Scott | 248/188.7 |
| 5,042,269 | 8/1991 | Sullivan | 62/285 |
| 5,290,004 | 3/1994 | Frost et al. | 248/188.7 X |

*Primary Examiner*—Ramon O. Ramirez
*Assistant Examiner*—Anita M. King
*Attorney, Agent, or Firm*—Calfee Halter & Griswold LLP

[57] ABSTRACT

A knock down ready-to-assemble motor mount for supporting a motor within an air conditioning unit includes two substantially identical support structures perpendicularly arrangeable about a motor casing and held in perpendicular intersection adjacent the motor casing by a hub which straddles intersecting cross members of the support structures and provides a support base for the motor casing, whereby the support structures are held in a perpendicular arrangement about a motor casing by the hub without permanent welded or brazed attachment of the support structures.

8 Claims, 4 Drawing Sheets

5,660,367

KNOCK DOWN MOTOR MOUNT

FIELD OF THE INVENTION

The present invention pertains generally to support structures and, in particular, to structural supports for motors.

BACKGROUND OF THE INVENTION

Structural supports for motors, such as electric motors of the type used to drive fan blades in air conditioning units, must hold the motor casing in a generally vertical orientation with a sealed end of the casing pointed downward and the motor shaft pointed upward to position the fan blade to rotate in a generally horizontal plane, as generally shown in FIG. 1. Such motor mounts typically include at least four supporting legs which extend from the perimeter of the fan blade housing to a clamp which grips the motor casing. In these types of motor mounts, failure of any welds or brazed connections of the legs to the motor casing clamp can cause the entire motor to drop into and catastrophically damage the compressor.

In other types of motor mounts, the legs include sections which extend around the side and bottom half of the motor casing, with a motor casing clamp positioned over these sections of the legs, as generally shown in FIG. 1. These sections of the legs thereby intersect at the center of the bottom of the motor casing, and may be welded or brazed at the point of intersection. However, with the legs welded together, the motor mount assembly is unwieldy and difficult and expensive to ship and handle.

SUMMARY OF THE INVENTION

The present invention overcomes these and other disadvantages of the prior art by providing a knock down motor mount which has two substantially identical interlockable support structures which form a rigid motor casing support structure without any welds or other permanent connection of the two support structures.

In accordance with one aspect of the present invention, a knock down motor mount includes two substantially identical interlockable support structures, each support structure including symmetrical opposed radially extending legs and lateral motor casing support sections spaced apart to receive a motor casing therebetween, each of the lateral support sections attached perpendicularly to a single cross member dimensioned to traverse the bottom of the motor casing opposite the shaft output, and wherein the support structures are arranged perpendicular about a motor casing with the bottom support section of each structure intersecting at the bottom of the motor casing, and a hub which locks the structures together at the point of intersection in the perpendicular arrangement about the motor casing.

These and other aspects of the invention will be apparent upon reading the following detailed description made with reference to the accompanying Figures.

DETAILED DESCRIPTION OF A PREFERRED EMBODIMENT

Figure 1:
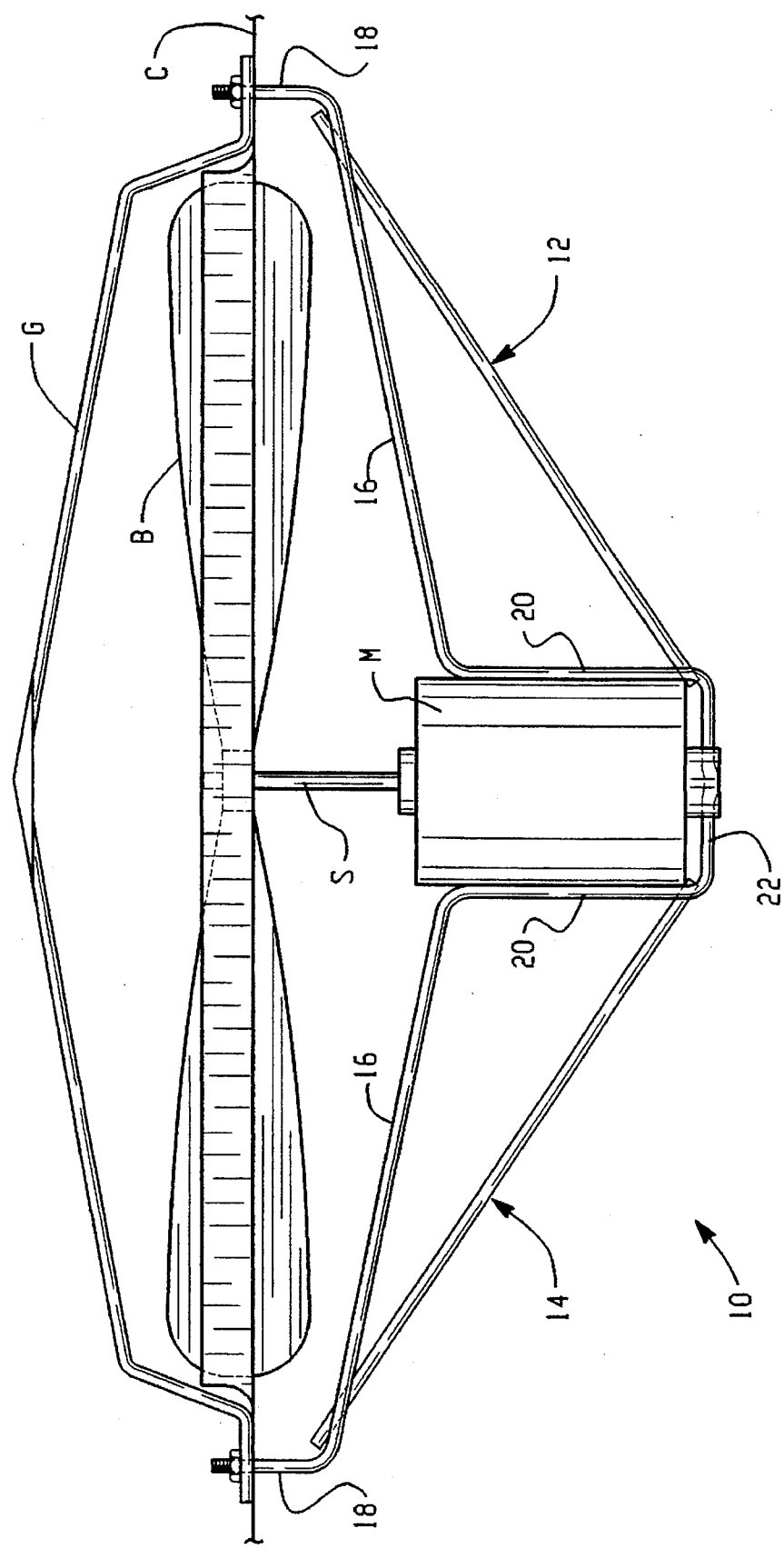
FIG. 1 is a side elevation of the Knock Down Motor Mount of the present invention.

FIG. 1 depicts a knock down motor mount of the present invention, indicated generally at 10, in an installed position, as for example within an upper exhaust region of an air conditioning unit, supporting a fan motor casing M with the fan motor shaft S vertically oriented to position the fan blade B for rotation in the horizontal plane of the top of the air conditioning unit. As further illustrated in FIG. 2, the motor mount 10 includes two substantially identical support structures 12 and 14, each of which include radially opposed outwardly extending legs 16 dimensioned to span from the outer perimeter of motor casing M to a radial extent beyond fan blade B. As shown in FIG. 1, radial distal ends 18 of each leg 16 are upwardly bent to perpendicularly intersect and attach to a top cover C of the air conditioning unit, as for example by a fastener secured to threads formed on distal ends 18. Peripheral edges of a fan guard G fit over distal ends 18 and also secured to cover C by fasteners.

Figure 3:
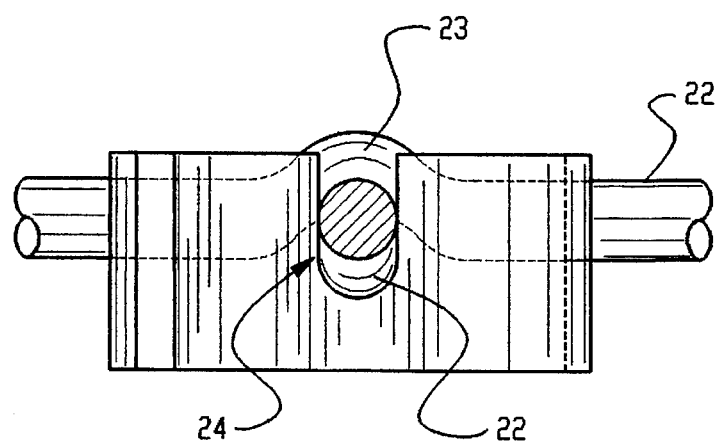
FIG. 3 is a partial cross section of intersecting cross members of the Knock Down Motor Mount of the present invention.

Opposite distal ends 18, each leg 16 further includes generally vertical sections 20 which extend from radially inward ends of legs 16 to the bottom of the motor casing M closely flanking the peripheral edges of motor casing M and terminating at a central cross member 22 which traverses the bottom of motor casing M. As shown in detail in FIG. 3, the center intersecting segments 23 of cross members 22 are symmetrically offset in the form of notches 24 which engage upon perpendicular intersection of cross members 22 to maintain structures 12 and 14 in the perpendicular arrangement.

Figure 2:
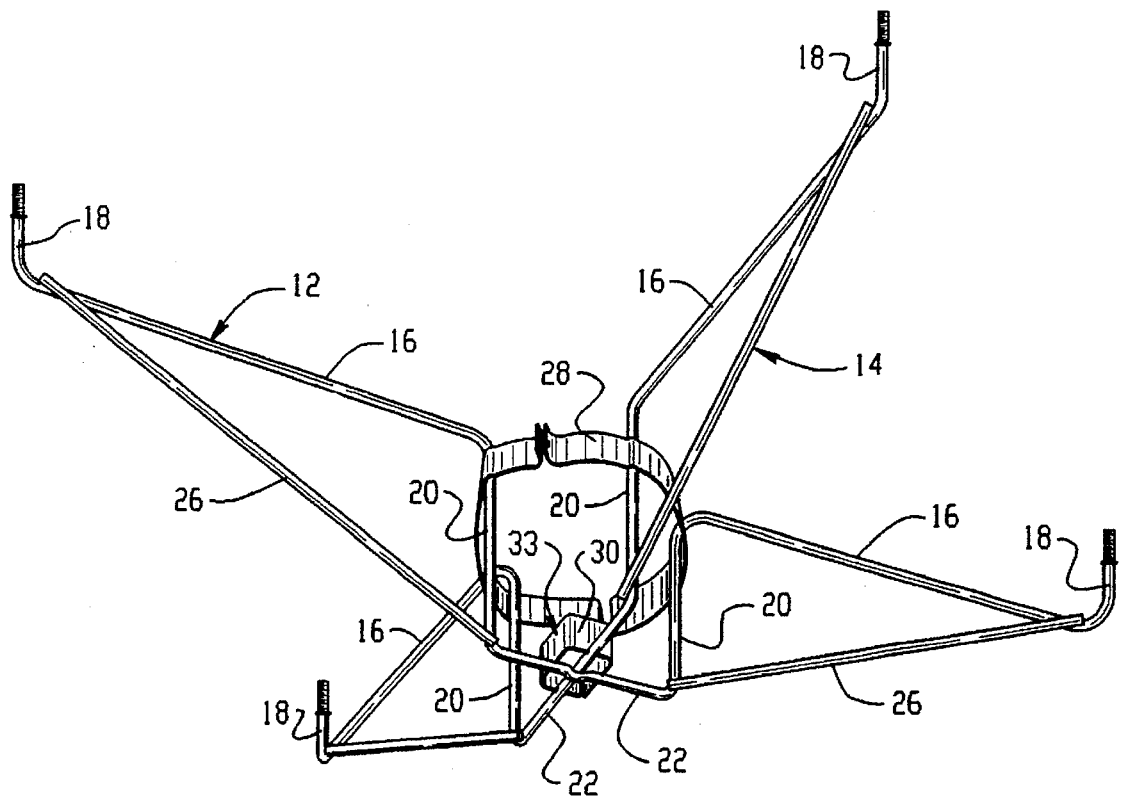
FIG. 2 is a perspective view of the Knock Down Motor Mount of the present invention.

As further shown in FIG. 2, each structure 12 and 14 includes two reinforcement members 26 which are attached by welding or brazing to extend generally from distal ends 18 to cross members 22. To secure the motor casing M within the radial array of the four vertical sections 20, a generally annular motor casing clamp 28 is disposed about the periphery of motor casing M to encircle vertical sections 20 and grip the motor casing M therebetween.

Figure 4A:
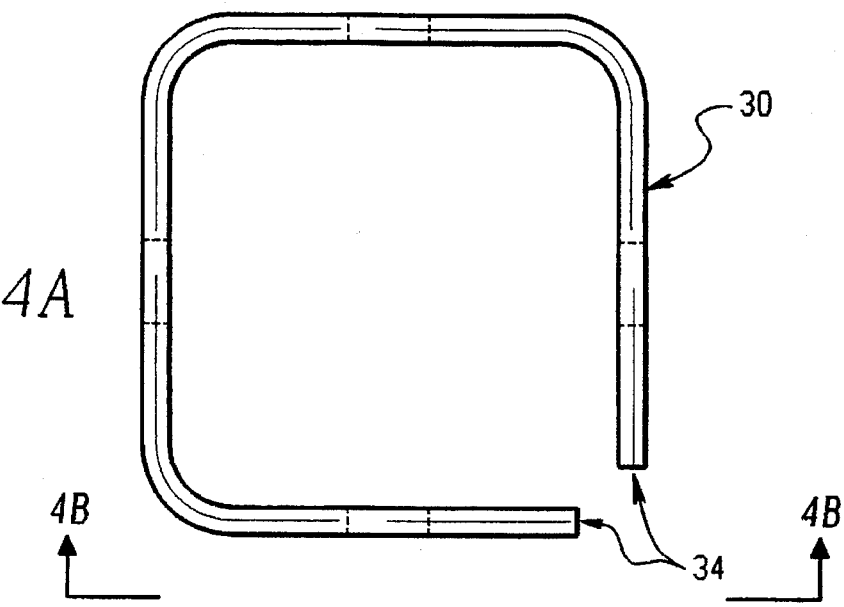
FIGS. 4A–4C are side and end elevations of the locking hub of the Knock Down Motor Mount of the present invention.
Figure 4B:
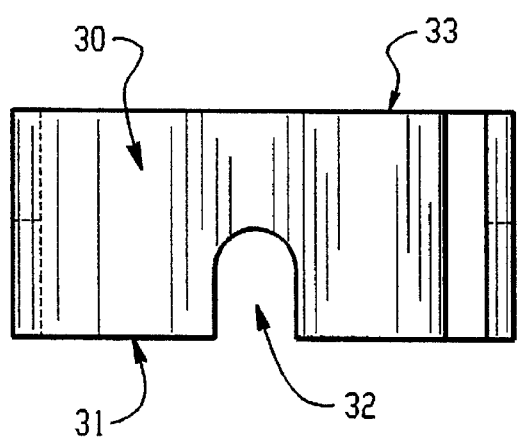
Figure 4C:
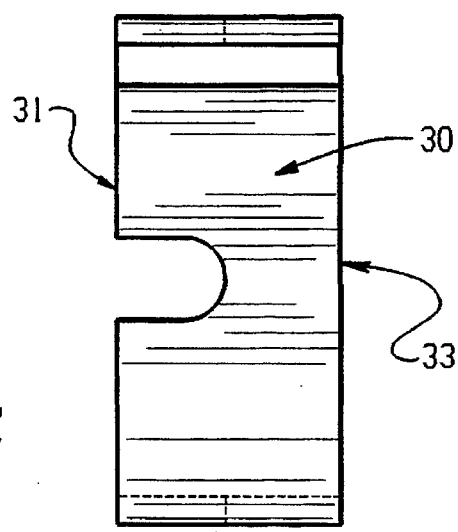

As further illustrated in FIG. 2, and in isolated detail in FIGS. 4A–4C, a hub 30 is provided to straddle the intersecting cross members 22 about the point of notched intersection. The hub 30 is formed, for example, of a single piece of flat rolled steel and bent to have four sides, with a common edge 31 of each side having a notch 32 dimensioned to receive a cross-sectional profile of cross member 22. The rigid construction of hub 30 holds cross members 22 in the perpendicular arrangement without the necessity of any permanent welding or brazing or other connection of the two support structures. As shown in FIG. 4A, open ends 34 of the hub 30 allow for a minimal amount of relative movement of the cross members as may be necessary upon installation of the motor mount. Edge 33, opposite edge 31, forms a motor casing support base upon which a bottom surface of motor casing M rests within the motor mount. The supporting height of hub 30, as measured from the innermost point of notches 32 to edge 33, can accordingly be selectively dimensioned to support the motor casing within the motor mount at any desired height relative to various dimensions of a particular installation such as, for example, the length of the motor casing and shaft relative to the vertical position of cross members 22. Hubs of different widths can therefore be readily interchanged with the same motor mount structure to compensate for dimensional variances in any particular installation.

Figure 5D:
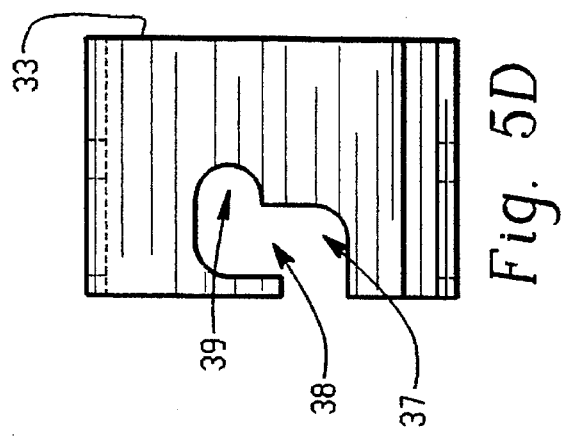
FIGS. 5A–5E are side and end elevations of an alternate embodiment of the locking hub of the Knock Down Motor Mount of the present invention.
Figure 5A:
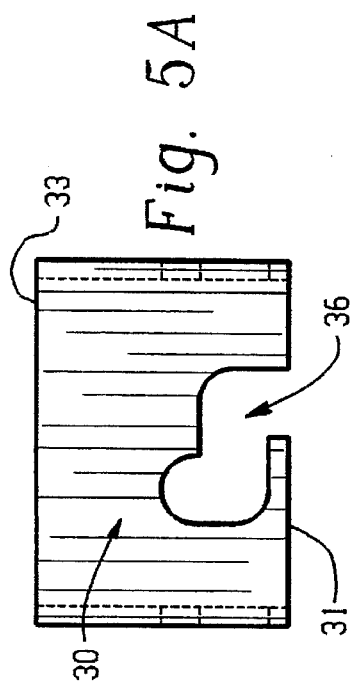
Figure 5C:
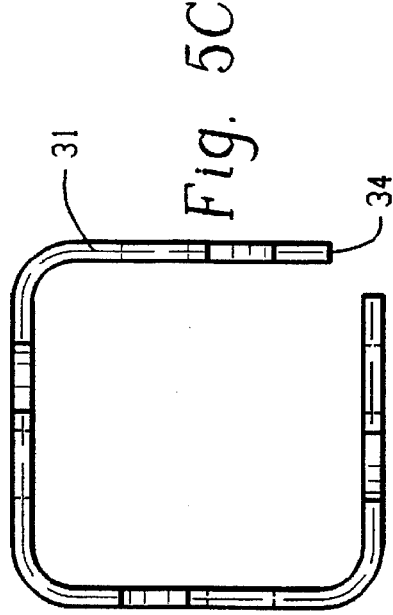
Figure 5E:
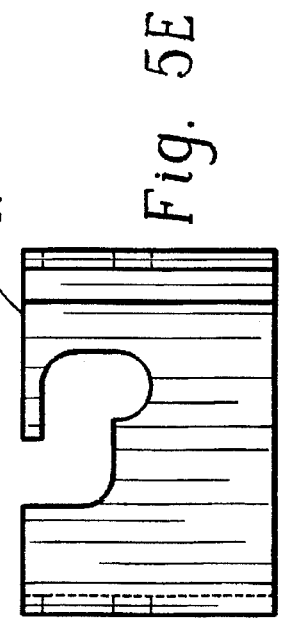
Figure 5B:
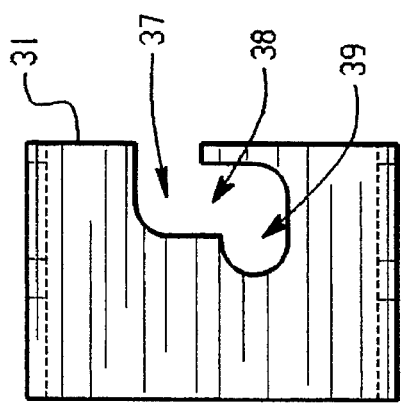

FIGS. 5A–5E illustrate in isolated detail an alternate embodiment of the hub 30 having locking notches 36 formed from common edge 31. Each locking edge 36 has a cross member entry section 37, a lateral offset section 38, and a locking notch 39 in which the cross section of cross members 22 ultimately rest in a fully engaged position. Each of the lateral offset sections 38 extend in a common lateral direction relative to entry section 37, whereby the locking hub is rotated about its center to slide over the cross members 22 and engage in locking notches 39. In this embodiment, the hub cannot be vertically lifted or knocked out of engagement with cross members 22 engaged in locking notches 39. In this embodiment also the width of the hub from the innermost point of locking notches 39 to edge 33 may be selectively dimensioned to support the motor casing M at a desired height. The cross-sectional configuration of the hub as shown in FIGS. 4A and 5C may be varied to, for example, an annular or elongate rectangular shape to optimize stable support of the motor casing M.

The invention thus provides a ready-to-assemble motor mount which rigidly supports a motor within an air conditioning unit at an exact height relative to an exhaust opening in the unit, and which does not require any welding or brazing attachment of the intersecting sections of the support structures. By eliminating the need to weld or braze the point of intersection of the support structures, the motor mount can be readily knocked down for compact shipment and handling, and just as easily assembled within the air conditioning unit either in the factory or at the installation site. Furthermore, the structural integrity of the motor mount at the point of intersection of the support structures is improved by the hub which is better suited than a welded connection to withstand continuous vibration of the motor without failure.

Although the invention has been shown and described with respect to certain preferred embodiments, alterations and/or modifications which may occur to those of skill in the art, such as the general and cross-sectional configuration of the hub, are within the basic concept of the invention as defined by the accompanying claims and equivalents thereto.

What is claimed is:

1. In combination, a motor mount and a fan motor, the motor mount configured to support the fan motor, in a generally vertical orientation within an air conditioning unit, the motor mount comprising:

two substantially identical support structures, each support structure comprising two legs extending radially outward in opposite directions, each leg terminating with a generally vertically oriented distal end adapted for attachment to said air conditioning unit, each leg further comprising a radially inward generally vertical section flanking a peripheral edge of a motor casing of the fan motor, each vertical section attached at a bottom end to a single cross member traversing a bottom surface of the motor casing, said two support structures arranged perpendicularly about the motor casing whereby said cross members of said support structures intersect adjacent a bottom end of the motor casing, and a hub having notches adapted to fit over segments of said cross members about the point of perpendicular intersection of said cross members, said hub being formed of a single piece comprising four generally planar sides, each side comprising a top edge and a bottom edge, each side comprising one of said notches in said bottom edge, and said top edge providing a support surface for the motor casing positioned between said radially inward generally vertical sections of said support structures, whereby said motor casing is vertically supported within said motor mount by said hub, and said motor casing provides a locking force upon said hub to lock said hub upon said cross members of said support structures.

2. The motor mount of claim 1 wherein said cross members of said support structures include oppositely offset notches at the point of perpendicular intersection.

3. The motor mount of claim 1 wherein said hub is generally rectangular in shape.

4. The motor mount of claim 1 wherein a supporting width of the hub measured from an innermost point of said notches to said edge opposite said notches is dimensioned to support a motor at a specific position within an air conditioning unit.

5. The motor mount of claim 1 wherein each of said notches of said hub further comprise a generally vertical entry section, a lateral section, and a locking notch adapted to lockingly engage said cross members.

6. A ready-to-assemble motor mount in combination with a motor having a motor casing, the motor mount comprising two substantially identical support structures, each support structure comprising radially outward extending legs terminating in generally vertically oriented distal ends adapted for attachment to an air conditioning unit, and radially inward vertical sections flanking the motor casing of the motor, said vertical sections connected at a bottom end to a single cross member traversing an end of the motor casing, said support structures perpendicularly arranged about the motor casing so that said cross members perpendicularly intersect adjacent an end of the motor casing, and a hub having four notches at ninety degree relative positions adapted to fit over said cross members, said hub positionable over a point of perpendicular intersection of said cross members to secure said support structures in a perpendicular arrangement wherein an edge of said hub opposite said notches forms a support surface for the motor casing.

7. The motor mount of claim 6 wherein said cross members further comprise opposing offset sections at the point of intersection.

8. The motor mount of claim 6 wherein said notches of said hub further comprise a locking section which engages the cross members.

* * * * *